US008863181B2

(12) United States Patent
Shin

(10) Patent No.: US 8,863,181 B2
(45) Date of Patent: Oct. 14, 2014

(54) BROADCASTING RECEIVER AND METHOD OF PROVIDING BACKGROUND CHANNEL EPG

(75) Inventor: Su Hyun Shin, Yongin-si (KR)

(73) Assignee: LG Electronics Inc., Seoul (KR)

( * ) Notice: Subject to any disclaimer, the term of this patent is extended or adjusted under 35 U.S.C. 154(b) by 750 days.

(21) Appl. No.: 13/060,978

(22) PCT Filed: Aug. 28, 2009

(86) PCT No.: PCT/KR2009/004845
§ 371 (c)(1),
(2), (4) Date: Feb. 25, 2011

(87) PCT Pub. No.: WO2010/024627
PCT Pub. Date: Mar. 4, 2010

(65) Prior Publication Data
US 2011/0157463 A1    Jun. 30, 2011

(30) Foreign Application Priority Data
Aug. 28, 2008  (KR) .......................... 10-2008-0084338

(51) Int. Cl.
*H04N 5/445*      (2011.01)
*H04N 21/462*     (2011.01)
(Continued)

(52) U.S. Cl.
CPC ....... *H04N 5/44543* (2013.01); *H04N 21/4622* (2013.01); *H04N 21/4345* (2013.01); *H04N 5/44591* (2013.01); *H04N 21/4316* (2013.01); *H04N 21/4821* (2013.01); *H04N 21/84* (2013.01); *H04N 21/4332* (2013.01); *H04N 21/6433* (2013.01); *H04N 21/4263* (2013.01); *H04N 21/4351* (2013.01)
USPC ............................................. 725/38; 725/41

(58) Field of Classification Search
CPC ..................................................... H04N 5/445
USPC ..................................................... 725/38, 41
See application file for complete search history.

(56) References Cited

U.S. PATENT DOCUMENTS 6,212,680 B1    4/2001  Tsinberg et al.
2003/0128302 A1  7/2003  Potrebic et al.
(Continued)

FOREIGN PATENT DOCUMENTS

CN        101102448 A    1/2008
CN        101155310 A    4/2008
(Continued)

*Primary Examiner* — Kieu Oanh T Bui
(74) *Attorney, Agent, or Firm* — Birch, Stewart, Kolasch & Birch, LLP

(57) ABSTRACT

The present invention relates to a broadcasting receiver and a method for providing a background channel EPG and comprises a first tuner that selects a channel chosen by a user; a second tuner that receives channels other than the channel tuned with said first tuner; a data parser that collects data broadcast signals from among the broadcast signals of the channels received at said second tuner; an image processor that processes said collected data broadcast signals to convert these into image data; a storage part that stores said converted image data; and a display part that displays the broadcast program information for the channels that are received via said second tuner, wherein said stored image data has been inserted into a channel screen selected via said first tuner. Thus, in the present invention, two tuners are used to capture the ACAP image of a background channel and insert it into the EPG program image of the background channel so that other channel information is converted into an image and provided to a user. In addition, the EPG program image of the present invention is generated by obtaining location information from the file system structure of broadcast program contents that represent an object unit and by capturing video data so that it can be shifted to the program of an applicable background channel and displayed when the EPG program image is executed. Also, the present invention provides detailed program information for the selected channel by extracting image data from a data broadcast signal and inserting it into the EPG as an image block for a selected channel.

43 Claims, 7 Drawing Sheets

(51) Int. Cl.
  *H04N 21/434* (2011.01)
  *H04N 21/431* (2011.01)
  *H04N 21/482* (2011.01)
  *H04N 21/84* (2011.01)
  *H04N 21/433* (2011.01)
  *H04N 21/6433* (2011.01)
  *H04N 21/426* (2011.01)
  *H04N 21/435* (2011.01)

(56) References Cited

U.S. PATENT DOCUMENTS

| | | | |
|---|---|---|---|
| 2004/0131076 A1* | 7/2004 | Smith | 370/432 |
| 2005/0193408 A1* | 9/2005 | Sull et al. | 725/32 |
| 2006/0061694 A1* | 3/2006 | Oh | 348/732 |
| 2006/0294574 A1 | 12/2006 | Cha | |
| 2007/0204291 A1 | 8/2007 | Ichihashi | |
| 2007/0245396 A1 | 10/2007 | Kwon et al. | |
| 2008/0010662 A1 | 1/2008 | Yum | |
| 2008/0092196 A1 | 4/2008 | Koh et al. | |

FOREIGN PATENT DOCUMENTS

| | | |
|---|---|---|
| EP | 1 467 561 A2 | 10/2004 |
| GB | 2 326 789 A | 12/1998 |
| JP | 9-284668 A | 10/1997 |
| JP | 2007-142887 A | 6/2007 |
| KR | 10-2006-0105344 A | 10/2006 |
| KR | 10-2007-0028768 A | 3/2007 |
| KR | 10-2008-0066306 A | 7/2008 |

* cited by examiner

BROADCASTING RECEIVER AND METHOD OF PROVIDING BACKGROUND CHANNEL EPG

TECHNICAL FIELD

The present invention relates to a broadcasting receiver and a method of offering EPG of background channels. More specifically, the present invention relates to a broadcasting receiver and a method of offering EPG of ACAP channels, which is able to output a broadcasting signal of a first channel received by a first tuner and to output background channel information by capturing program images of an advanced common application platform (ACAP) channel on EPG from ACAP data of a second channel received by a second tuner.

BACKGROUND ART

With the supply of data broadcasting, broadcasting receivers that receive and output data broadcasting signals have been consumed and popularized. According to such a conventional broadcasting receiver, once a user selects a predetermined channel, a tuner receives a broadcasting signal from the corresponding channel and the broadcasting signal is processed to be outputted in display means. Recently, as digital broadcasting age has come in earnest, a broadcasting viewing pattern has been changing from a one-way broadcasting program viewing pattern into a selective broadcasting viewing pattern. Such the selective broadcasting viewing is enabled by EPG (electronic program guide) and the user can view and record broadcasting programs selectively based on guide of programs which will be broadcasted later by using EPG.

The EPG supplies information service of program schedules of multi-channels to the user and it will be extended as service guide to be a core service technology of business models.

DISCLOSURE

Technical Problem

Terrestrial broadcasters specifying ATSC standard transmits only channel organization information and data broadcasting organization information their own. As a result, to detect background channel organization information in a channel viewed at the present, the user has to tune channels and then he/she can receive organization information of the other broadcasting stations.

Because of that, the user has to select each channel to gain each data broadcasting information corresponding each of the plural channels. If ACAP data broadcasting information is collected from each channel, the user has to select background channels on EPG by using remote control one by one and to identify ACAP screen inconveniently.

Technical Solution

To solve the problems, an object of the present invention is to provide a broadcasting receiver that is able to capture and display ACAP image of a background channel in EPS specific information window by using ACAP data received by a second tuner, such that a user may recognize organized channel information without selecting the other channels except the channel broadcasted currently and that ACAP image of the background channel may be imaged and supplied to the user.

To achieve these objects and other advantages and in accordance with the purpose of the invention, as embodied and broadly described herein, a broadcasting receiver offering EPG of a background channel includes a first tuner tuning a channel selected by a user; a second tuner receiving the other channels except the channel tuned by the first tuner; a data parser collecting a data broadcasting signal out of broadcasting signals of the received channel through the second tuner; an image processor processing the collected data broadcasting signal into an image data; a storage unit storing the processed image data; and a display unit displaying broadcasting information of the channel received by the second tuner on a screen of the channel tuned by the first tuner, the broadcasting program information having the stored image data inserted therein.

The channel received by the second tuner may be advanced common application platform (ACAP) type.

The broadcasting receiver offering the EPG of the background channel may further include a demultiplexer demultiplexing and outputting a broadcasting stream received by the second tuner; and a section filter filtering DSM-CC section data from the demultiplexted stream.

The demultiplexer may decode a PSI table of transport stream (TS) received by the second tuner and the demultiplexer may output corresponding TS based on PID defined in PMT table of PSI table.

The section filter may filter DSM-CC section data and DSM-CC private section data located in payload of the demultiplexed data stream based on a value of table_id.

The data parser may parse a file system structure of an object unit broadcasting program contents from the DSM-CC section data filtered by the section filter based on an object key.

The data parser may parse data carousel module, object carousel module, download server initiate (DSI), download info indication (DII) from the DSM-CC section data filtered by the section filter by using ZAVA program.

The data parser may form a file system structure of object unit broadcasting program contents from the DSM-CC private section based on the object key defined in the object carousel.

The storage unit may store the broadcasting program contents collected by the data parser in a file system type having an object unit directory structure.

The broadcasting receiver offering the EPG of the background channel may further include an EPG application manager capturing and processing video data of the channel received by the second tuner by operating an object key from the object unit file system corresponding to the stored image data to be inserted as EPG program image.

The EPG application manager may include an EPG key generator generating an EPG application key of the channel received by the second tuner by operating the object key that is an object identifier from the DSM-CC section data stored in the storage unit; an EGP image processor generating video data of the channel received by the second tuner based on the generated EPG application key to capture the generated video data as program image of corresponding background channel; and an EPG data encoder encoding the captured video data of the channel received by the second tuner into an image file of the EPG data.

The EPG image processor may generate the video data of the background channel by acquiring location information of program contents registered in the file system based on the object key.

The EPG image processor may include an image capturer capturing the video data of the background channel by acquiring the location of background channel program contents based on the object key that is the only identifier capable of identifying objects from the DSM-CC section data; an image extractor extracting an EPG program image of the background channel based on the scene priority and the storage number of the captured video data, to be inserted on EPG; and an image scaler resizing the extracted EPG program image of the background channel to suit to an output screen of the EPG data of the background channel.

The image data may be inserted in the EPG that is the broadcasting program information of the channel received by the second tuner.

The channel may move to a corresponding channel based on the object key, if the program image on the EPG is operated.

The changed image data may be periodically updated and stored.

In another aspect of the present invention, a broadcasting receiver offering EPG includes a tuner tuning a channel selected by a user; a data parser collecting a data broadcasting signal of the selected channel; an image processor processing and changing the collected data broadcasting signal into image data; and a display unit displaying broadcasting program information of the selected channel having the changed image data inserted therein.

The changed image data may be displayed in specific information of the EPG.

Sub-image search related to the program may be offered by using a navigation key in the specific information of the EPG.

The channel may move to a corresponding channel based on the object key if the program image on the EPG is operated.

The channel received by the tuner may be ACAP type.

The broadcasting receiver offering the EPG may further include an EPG application manager capturing video data of the channel received by the tuner to insert and process the captured video data into EPG program image.

The EPG application manager may include an EPG key generator generating an EPG application key of the channel received by the tuner by operating the object key that is an object identifier from the DSM-CC section data of the collected data broadcasting signal; an EGP image processor generating video data of the channel received by the tuner based on the generated EPG application key to capture the generated video data as program image of the selected channel; and an EPG data encoder encoding the captured video data into an image file of the EPG data.

The EPG image processor may generate the video data of the selected channel by acquiring location information of program contents registered in the file system based on the object key.

The EPG image processor may include an image capturer capturing the video data of the selected channel by acquiring the location of the selected channel program contents based on the object key that is the only identifier capable of identifying objects from the DSM-CC section data; an image extractor extracting an EPG program image of the selected channel based on the scene priority and the storage number of the captured video data, to be inserted on EPG; and an image scaler resizing the extracted EPG program image to suit to an output screen of the EPG data of the selected channel.

In a further aspect of the present invention, a method of offering EPG of a background channel to a broadcasting receiver comprising steps of: displaying a broadcasting program of a channel selected by a user by using a first tuner; collecting a data broadcasting signal out of the received broadcasting signal by using a second tuner; processing the collected data broadcasting signal into image data; storing the changed image data; and displaying broadcasting program information of the channel received by the second tuner on the channel screen tuned by the first tuner, with the stored image data inserted in the broadcasting program information.

The second tuner may receive the other channels except the channel tuned by the first tuner.

The channel received by the second tuner may be ACAP type.

The method of offering the EPG of the background channel to the broadcasting receiver may further include steps of: demultiplexing and outputting broadcasting stream received by the second tuner; and extracting DSM-CC section data from the demultiplexed stream.

The step of demultiplexing the received broadcasting stream may decode PSI table of the broadcasting stream and it may output corresponding broadcasting steam based on PID defined in PMP table of PSI table.

The step of extracting the DSM-CC section data may filter the DSM-CC section data into DSM-Cc section data located in a payload of the demultiplexed data stream and DSM-CC private section data based on a value of table_id.

Data carousel module, object carousel module and DSI and DII may be parsed from the extracted DSM-CC section data by using ZAVA program.

A file system structure of object unit broadcasting program contents may be formed based on an object key defined in the parsed object carousel.

Contents of the collected data broadcasting signal may be stored in a file system type having an object unit directory structure.

The image data may be inserted in the EPG that is broadcasting program information of the channel received by the second tuner.

An object key may be operated from an object unit file system corresponding to the stored image data and the video data of the channel received by the second tuner is captured to insert and process the captured video data as EPG program image.

The step of inserting the EPG program of the channel received by the second tuner may include steps of: operating an object key from the stored object unit file system and generating an EPG application key of the channel received by the second tuner based on the operated object key that is an object identifier; generating video data of the channel received by the second tuner and capturing/processing the generated video data as EPG program image of a corresponding background channel; and encoding the captured video data of the background channel into image file of EPG data.

The video data of the background channel may be generated by acquiring location information of broadcasting program contents registered in the stored object unit file system based on the object key.

The step of capturing/processing the EPG program image of the channel received by the second tuner may include steps of: operating an object key that is the only identifier capable of identifying objects from the DSM-CC section data and capturing video data of the background channel by acquiring a broadcasting program content location of the channel received by the second tuner; extracting an EPG program image of the channel received by the second tuner based on the scene priority and the storage number of the captured video data, to be inserted on EPG; and resizing the extracted EPG program image of the background channel to suit to an output screen of the EPG data of the background channel.

The channel may move to a corresponding channel based on the object key, if the program image on the EPG is operated.

The changed image data may be periodically updated and stored.

Program specific information of the channel received by the second tuner may be displayed in a block, if the program image on the EPG having the image data inserted therein is selected.

A functional button for moving to the former or next image of the broadcasting program may be provided on the EPG.

Functional buttons for location shift, confirmation, former/next step, data search, reservation recording/viewing, cancellation and exit may be further provided on the EPG.

The program image of the channel received by the second tuner may be offered based on scene priority of a corresponding program and the number of the stored video data.

The program specific information of the channel received by the second tuner may include basic information of broadcasting contents including a title, genre, abstract, keyword and playing role, group information including a cast and producer and critic information of the contents and information on a content list and a preference list viewed by the user.

In a still further aspect of the present invention, a method of offering EPG of a background channel to a broadcasting receiver includes steps of: receiving a broadcasting stream by tuning a selected channel; collecting a data broadcasting signal from the received broadcasting stream; processing and changing the collected data broadcasting signal into image data; displaying broadcasting program information, with inserting the changed image data in EPG of the selected channel; and displaying program specific information of the selected channel in an image block if an program image on the EPG having the image data inserted therein is selected.

Advantageous Effects

The present invention has following advantageous effects.

According to the present invention, there is an advantageous effect of imaging the other channel information except the channel broadcasted currently by capturing and inserting ACAP image of a background channel as EPG program image of the background channel by using two tuners.

Furthermore, the EPG program image is generated by acquiring location information from a file system structure of object unit broadcasting program contents and capturing the video data. As a result, there is another advantageous effect of displaying a program of a corresponding background channel after moving if a program image on EPG is operated.

A still further, there is a further advantageous effect of offering program specific information of a selected channel in an image block by extracting and inserting image data from a data broadcasting signal in the EPG of the selected channel.

DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings:

FIG. 4 including

BEST MODE

Reference will now be made in detail to the specific embodiments of the present invention, examples of which are illustrated in the accompanying drawings. Wherever possible, the same reference numbers will be used throughout the drawings to refer to the same or like parts.

Figure 1:
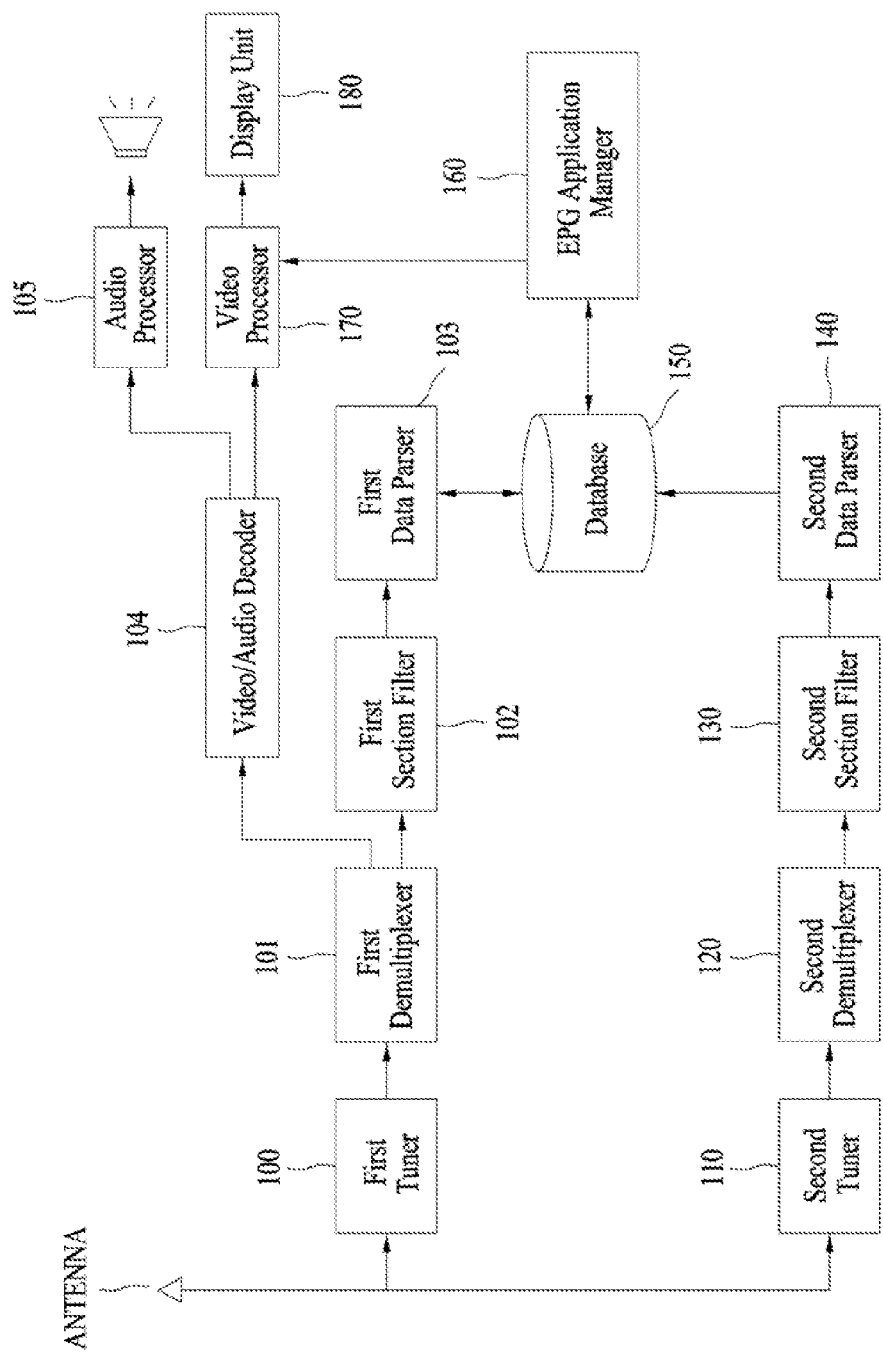
FIG. 1 an inner block view illustrating a digital broadcasting receiver capable of supplying EPG of background channels according to an exemplary embodiment of the present invention.

FIG. 1 is a block view schematically illustrating a digital broadcasting receiver according to an exemplary embodiment of the present invention. As shown in FIG. 1, the digital broadcasting receiver includes a first tuner 100, a first demultiplexer 101, a first section filter 102, a first data parser 103, a video/audio decoder 104, an audio processor 105, a second tuner 110, a second demultiplexer 120, a second section filter 130, a second data parser 140, a database 150, an EPG application manager 160, a video processor 170 and a display unit 180.

The first tuner 100 receives a broadcasting signal of a channel selected by a user out of plural broadcasting signals received via an antenna. The broadcasting signal received via the tuned channel has a transport stream (TS). Especially, the broadcasting signal received by the first tuner is displayed in a main screen of the digital broadcasting receiver.

The first demultiplexer 101 demultiplexes and outputs transport stream of the broadcasting signal received via the first tuner 100. Here, the received transport stream is decoded into video, audio and data streams. Specifically, the transport stream is MPEG-2 TS 188 byte unit packet and the packet includes a header having information thereof and payload having actual data. MPEG-2 TS determines whether corresponding payload is decoded video, audio or data stream based on packet identifier (PID) of the packet header. As plural programs having video, audio and data may be multiplexed into single TS, a PID list of each program and entire programs is defined in a specific data pattern to identify the plural programs. Such information is referenced to as program specific information (PSI). PSI includes a program association table (PAT) and a program map table (PMT), a conditional access table (CAT). PMP has information of video, audio and data composing a single program and PID information identifying the video, audio and data information.

The first section filter 102 receives data stream separated from the TS demuliplexed by the first demultiplexer 101 and it detects PID and table ID of this packet header. Then, the first section filter 102 separates program data and related program guide data from the TS.

The first data parser 103 reads PMP information in the PMP based on PAT of EPG data from the table ID detected by the first section filter 102 to find each PMP packet. After that, the first data parser 103 separates PID of each data packet to form information of a single program. Since such the PID separation of each data packet of the single program enables transportation of broadcasting data, PAT and PMP may be transmitted in digital broadcasting periodically. The IPG data information is stored in the database 150.

The video/audio decoder 104 receives video/audio stream from the TS demultiplexed and separated from the first demultiplexer 101 and it compressively decodes and outputs the video/audio stream.

The second tuner 110 receives background channels displayed in a sub-screen of the digital broadcasting receiver according to the present invention. The received channel includes TS type digital broadcasting signals and data for data broadcasting. The signal for the data broadcasting is transmitted to digital storage media-commandn and control (DSM-CC) section format data. To transmit structured groups of objects in a data encoding way in ACAP, DSM-CC transmits a module of DSM-CC data carousel and DSM-CC object carousel.

The second demultiplexer 120 demultiplexes and outputs TS of a broadcasting signal received by the second tuner 110. Specifically, the second demultiplexer 120 decodes PSI table to decode the TS received via the second tuner 120 and it decodes and outputs data broadcasting stream corresponding to elementary stream PID defined according to each descriptor of PMP table out of PSI table.

The second section filter 130 filters encoded DSM-CC section data positioned in payload of the TS decoded by the second demultiplexer 120. Here, the second section filter 130 filters DSM-CC section data and private section data based on table_id value.

from DSM-CC section data filtered by the second section filter 130 by using ZAVA program, the second data parser 140 analyzes download server initiate (DSI) including the data carousel module, object carousel module and information of route object that is a section representing a single carousel and download info indication (DII) including content information such as the size encoding of each module and position information related to PID.

When downloading from the broadcasting receiver, the DSI is employed to start file system establishment. Contents are established into file system structure by the object unit according to object key defined in the object carousel by the module. The carousel is module typed to transmit objects. The module includes more than objects. To transmit entire file system, a control message is provided to control plural modules and the control of the modules. If the file system desired to transmit is modulized and a corresponding control message for controlling the control of the module receiving is generated, a single sequence corresponding to a first transmission and 'object carousel' means to transmitting the generated single sequence circularly. The object carousel includes various files which forms a file system under a directory structure.

According to a method of identifying each elements of the object carousel, each carousel has an independent carousel_id and each module has an independent module_id in the single carousel.

Each object has an independent object_key in the single module only to form data content structure having directory and file type via carousel scenario. As a result, after the second data parser 140 analyzes the data carousel and the object carousel, data broadcasting program contents may be parsed from DSM-cc private section.

The database 150 stores the EPG data outputted by the first data parser 103 and the object-unit broadcasting program contents parsed by the second data parser 140 in a file system of directory structure.

*84The EPG application manager 160 includes an EPG key generator 50, an EPG image processor 60 and an EPG data encoder 70. The EPG application manager 160 according to the present invention generates EPG program image of a background channel by using the EPG data and the file system of the object-unit broadcasting program content stored in the database 150 and it manages EPG of the ACAP channel including the generated EPG program image.

The video processor 170 processes the video signal decoded by the video/audio decoder 104 into an image signal of the main screen and it processes the EPG data of the background channel including the ACAP channel program image outputted by the EPG application manager 160 to output it to a sub-screen as OSD (on screen display) way.

The audio processor 170 amplifies the audio signal decoded by the video/audio decoder 104 and it outputs the amplified signal via a speaker.

The display unit 180 displays an input broadcasting signal of the channel selected by the user in the main-screen and it displays the EPG data of the background channel including the program image of ACAP channel in the sub-screen in OSD way.

Figure 2:
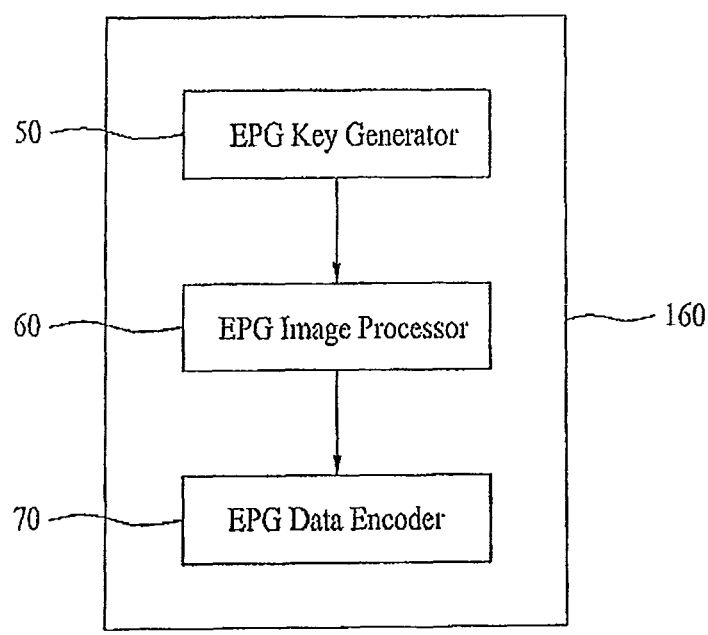
FIG. 2 is a block view illustrating an EPG application manager that generates EPG having program images of background channels according to the embodiment of the present invention.

FIG. 2 is a block view illustrating the EPG application manager generating EPG having the program image of ACAP channel according to the embodiment of the present invention.

The contents including the ACAP channel broadcasting program may be encoded into object carousel, data carousel, and MPEG2 Ts packet to be transmitted to a channel in a band and to be decoded by the broadcasting receiver.

The EPG key generator 50 operates an object key that is the only identifier capable of identifying objects from DSM-Cc section stored in the database 150 and it generates an EPG application key of ACAP channel. As shown in Table 1, Meta data of ACAP channel includes an object structure representing relations of objects, an object key that is the only identifier capable of identifying the objects and object information for explaining corresponding object.

TABLE 1

| META DATA | EXPLANATION |
|---|---|
| OBJECT STRUCTURE | Interrelation of objects composing transport stream (TS) |
| OBJECT KEY | The only identifier capable of identifying objects. |
| OBJECT INFORMATION | Explaining corresponding object |

```
module BIOS{
    struct ServiceGatewayInfo{
        IOP;;IOR                              objectRef;
        sequence<DSM;;Tap,255>                Taps;
        sequence<ServiceContext,255>
serviceContextList;
        sequence<octect,65535>                userInfo;
    };
};
```

The EPG image processor 60 generates video data of the ACAP channel according to the EPG application key of the generated ACAP channel and it captures the generated video data into EPG program image of the background channel. Specifically, the object carousel includes object message units of the contents registered in the file system, for example, directory, file, stream even and service gate way object message. The object carousel acquires location information of the application based on the corresponding object key and it captures the video data of the ACAP channel into the EPG program image.

The EPG data encoder 70 encodes and outputs the captured video data of the ACAP channel together with the EPG application data into image files, for example, JPG and the like.

Figure 3:
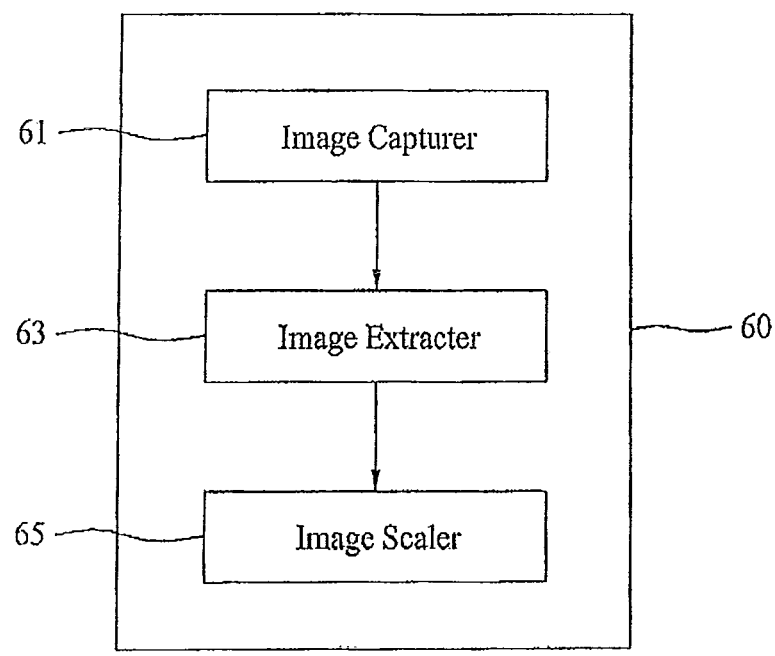
FIG. 3 is a block view illustrating an EPG image processing unit that generates EPG program images of the background channels.

FIG. 3 is a block view illustrating the EPG image processor for generating the EPG program image of the background channel according to the embodiment of the present invention.

An image capturer 61 operates the object key that is the only identifier capable of identifying the object from the DSM-CC section. Then, the image capturer 61 acquires a program location of the ACAP channel and it captures the ACAP channel video data.

An image extractor 62 extracts corresponding EPG program images of the ACAP channel based on scene priority and the number of corresponding video data to insert the extracted EPG program image out of the captured video data.

An image scaler 65 resizes the extracted EPG program image to suit the sub-screen outputting the EPG data of the background channel.

FIG. 4 (a and b) is a diagram illustrating a display screen outputting the ACAP image in the EPG channel information of the digital broadcasting receiver according to the present invention.

Figure 4A:
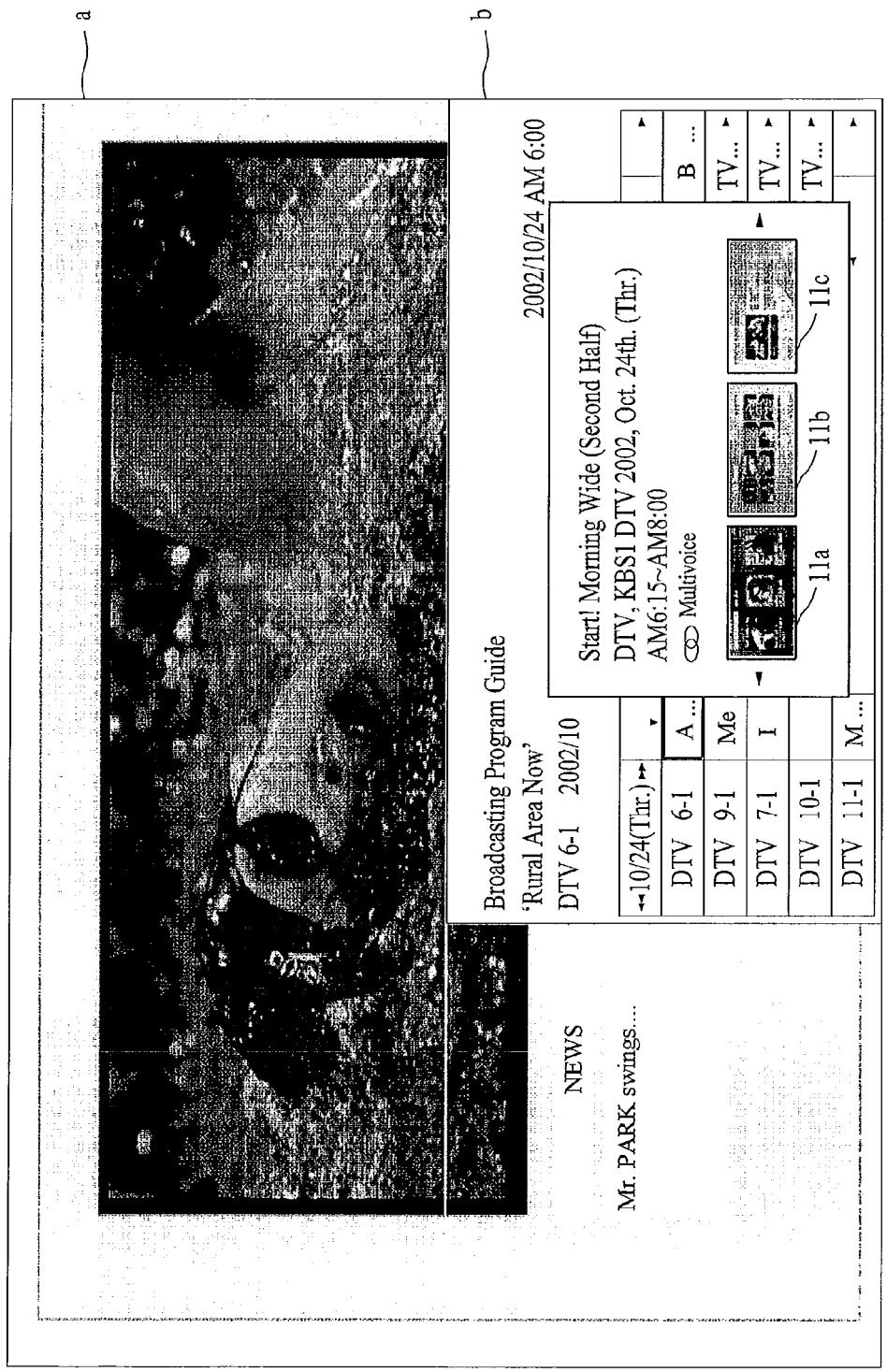
FIGS. 4a and 4b is a diagram illustrating EPG of the background channel displayed in a sub-screen of the digital broadcasting receiver according to the embodiment of the present invention.

As shown in FIG. 4. 4a and 4b, the broadcasting program of the channel tuned by the user is displayed in the main-screen (a) and the EPG including the ACAP channel program image required by the user is displayed in the sub-screen (b). FIG. 4a shows the EPG including the ACAP channel program image in a table according to the present invention. The EPG information displayed in the sub-screen (b) includes channel information, broadcasting time, broadcasting program tiles and images (11a, 11b and 11c of a corresponding broadcasting program. The ACAP channel supplies EPG program images on EPG based on video data priority of the corresponding program and the number of stored video data. An EPG program image block includes a functional button for calling the former or next image.

A table displaying EPG information further includes a functional button for controlling EPG information such as moving locations of the ACAP channel and program, identification and former/next ACAP channel and program, date search, reservation recording/viewing, cancel or exit and the like.

If the EPG program image of the background channel is operated by the user, the channel is moved into ACAP channel by the object key such that corresponding broadcasting program is displayed in the main-screen (a).

Figure 4B:
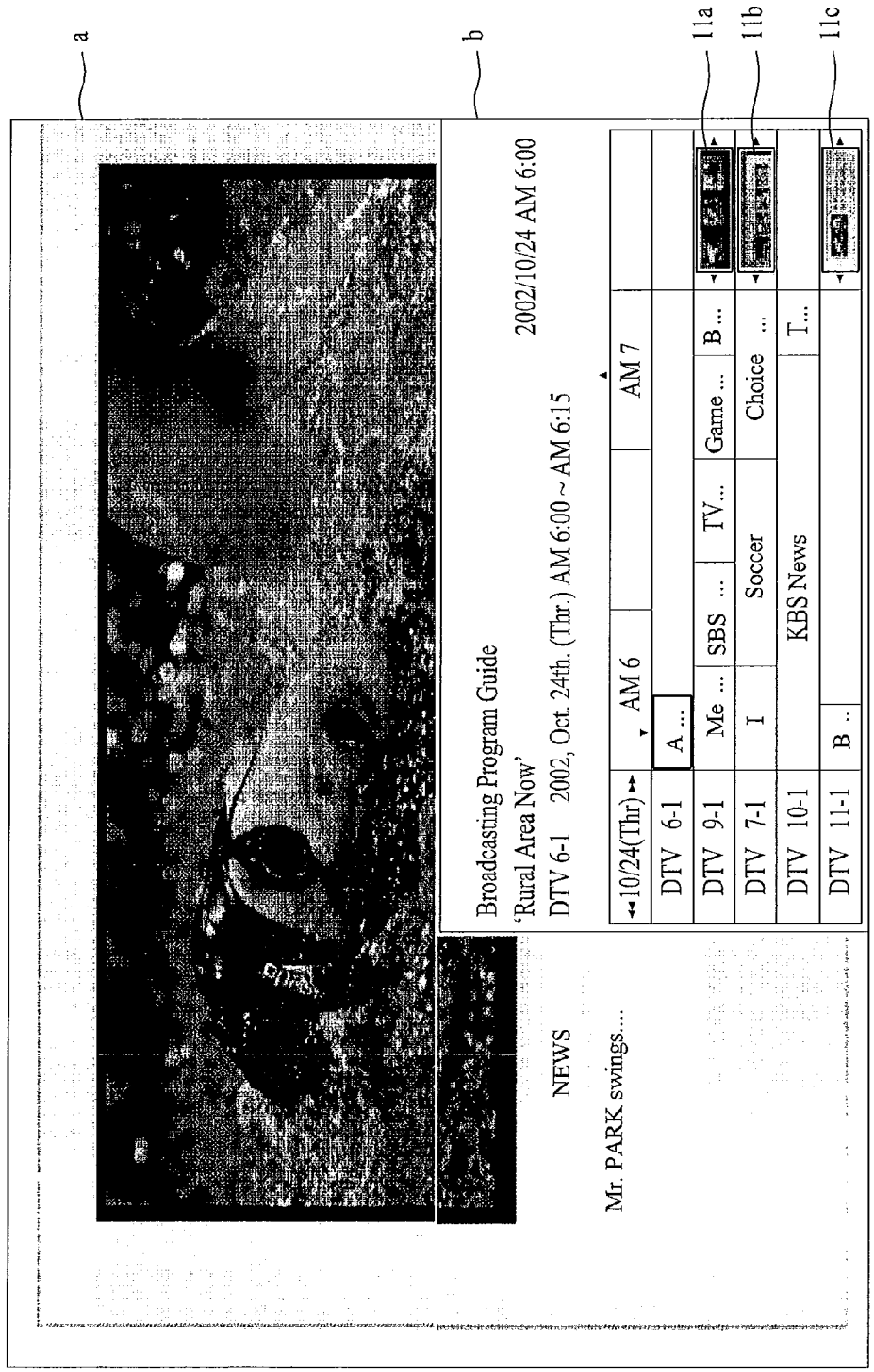

FIG. 4b is a diagram illustrating EPG including ACAP channel program images according to another embodiment of the present invention. The EPG information displayed in the sub-screen (b) according to this embodiment of the present invention may include channel information, broadcasting time, broadcasting program tiles. If the user selects a program of the background channel on EPG, an image block having specific information and program images (11a, 11b and 11c) of the corresponding program is outputted. The EPG program image is supplied based on the priority and stored number of the video data. The image block includes a functional button for moving into the former or next image of EPG program. The specific information of the background channel may write basic information of the contents, for example, titles, genres, abstracts, keywords and playing roles and the like, group information, cast and producer information and critic information of the contents. In addition, it writes information on a content list and a preference list viewed by the user based on the user information stored in the database or it includes information on content segment such as a highlight part or specific part.

The table displaying the EPG information may include a functional button for controlling the EPG data on EPG, for example, move the locations of the background channel and program, confirmation, former/next, data searching, reservation record/viewing, deletion or exit.

In addition, if the EPG program image of the background channel is operated by the user, the object key moves the channel into the ACAP channel and the corresponding program is displayed in the main-screen (a).

Figure 5:
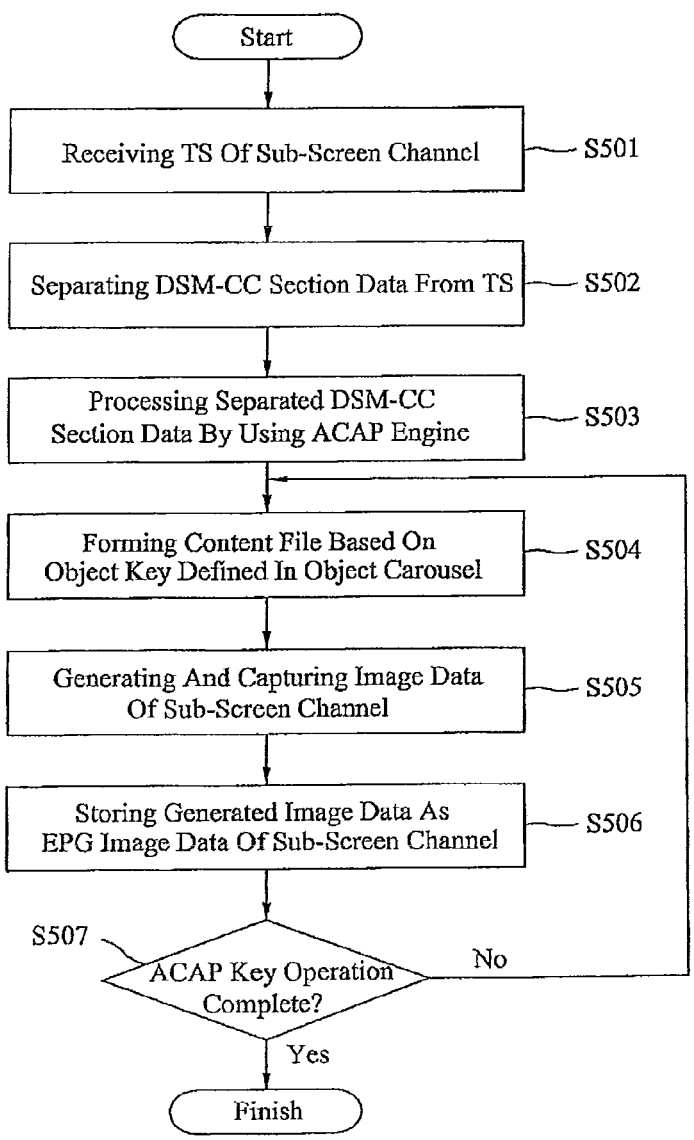
FIG. 5 is a flow chart illustrating a method of generating EPG having program images of the background channel of the digital broadcasting receiver according to the embodiment of the present invention.

FIG. 5 is a flow chart illustrating a method of generating a program image of ACAP channel on EPG of a background channel of the digital broadcasting receiver having above configuration according to the present invention.

ACAP TS of the background channel displayed in the sub-screen of the digital broadcasting receiver is received by the second tuner (S501).

The received TS is decoded and the encoded DSM-CC section data located in the payload of the TS is separated (S502). Here, the DSM-CC section data and the private section data are filtered based on a value of 'table_id'.

The separated DSM-CC section data is analyzed into object unit directory and file type data structure via the DSM-CC data carousel scenario by using ZAVA program that is a ACAP engine (S503).

The broadcasting content file is formed from the DSM-CC private section according to the object key defined by the object carousel based on the analyzed data structure (S504)

The object key is operated and the location information of the broadcasting program content file is acquired. Then, the program video data of the ACAP channel is captured to the EPG program image data of the background channel (S505). Here, the EPG program image of the corresponding ACAP channel is generated out of the captured video data based on the program scene priority or the number of program scenes. In addition, the generated EPG image is resized by the scaler to suit the sub-screen outputting the EPG data of the background channel.

The captured program video data of the ACAP channel is encoded into image file, for example, JPG together with the EPG application data only to be stored in the EPG of the background channel (S506).

The video data of the ACAP channel is captured with respect to all the objects of the TS and the ACAP key generated the EPG program image of the background channel is operated (S507).

Figure 6:
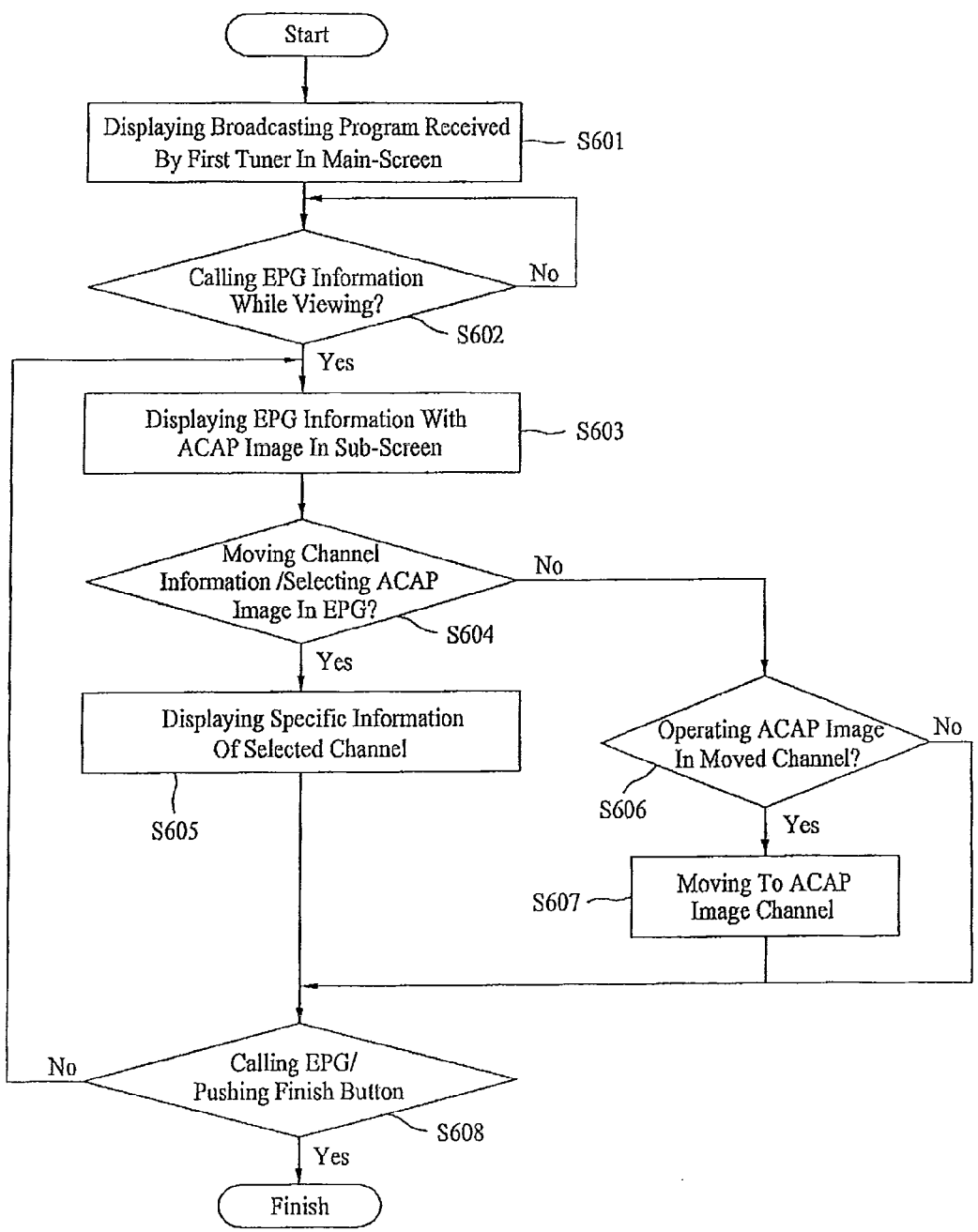
FIG. 6 is a flow chart illustrating a method of displaying detail information of the EPG the digital broadcasting receiver according to the embodiment of the present invention.

FIG. 6 is a flow chart illustrating a method of displaying the EPG specific information including the program image of the background channel in the digital broadcasting receiver according to another embodiment of the present invention.

The broadcasting signal of the channel selected by the user is received by the first tuner and the received broadcasting signal is displayed in the main-screen of the digital broadcasting receiver (S601).

While the received broadcasting program is displayed in the main-screen, EPG calling signal of the background channel is received by the user (S602).

The EPG including the program image of the background channel is displayed in the sub-screen as semi-transparent or transparent OSD on the broadcasting program displayed in the main-screen (S603). Here, channel information, broadcasting time, broadcasting program tile and EPG program image are tabled on the EPG.

A signal for channel move and EPG program image selection is detected on the EPG displayed in the sub-screen (S604).

If the background channel or EPG program image is selected, the program specific information of the background channel including the EPG program image is outputted in image blur (S605). At this time, the specific program information of the background channel may write basic information on the contents including titles, genres, abstracts, keywords, playing roles and the like and group information related to the contents, cast and producer information and critic information of the contents. Also, the specific program information may write information on user preference and list of contents viewed by the user, having information related to a content segment such as a highlight part or specific part.

A signal for identifying or operating the EPG program image on the EPG is detected (S606). If the EPG program image of the background channel is operated, the channel is moved to the background channel by the object key and then the corresponding program is displayed in the main-screen (a) (S607).

In the meanwhile, the terminology user in the specification of the present invention is defined in consideration of functions and it may be varied according to purpose or practices of people who pertains to the art. As a result, the definition of terminology may be performed based on the content of the description.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention has an industrial applicability.

According to the present invention, the two tuners are used to capture the ACAP image of the background channel and the captured ACAP image is inserted on EPG as EPG program image of the background channel. As a result, different channel image may be imaged and displayed to the user.

The invention claimed is:

1. A broadcasting receiver for offering EPG of a background channel, comprising:
   a first tuner configured to tune a channel selected by a user;
   a second tuner configured to receive a channel except the channel tuned by the first tuner;
   a data parser configured to collect a data broadcasting signal out of broadcasting signals of the received channel through the second tuner;
   an image processor configured to process the collected data broadcasting signal into image data;
   a storage unit configured to store the processed image data;
   a display unit configured to display broadcasting information of the channel received by the second tuner on a screen of the channel tuned by the first tuner, the broadcasting program information having the stored image data inserted therein; and
   an EPG application manager configured to capture and process video data of the channel received by the second tuner by operating an object key from an object unit file system corresponding to the stored image data to be inserted as an EPG program image,
   wherein the EPG program image is displayed along with a broadcasting program image of the selected channel on the screen.

2. The broadcasting receiver for offering the EPG of the background channel as claimed in claim 1, wherein the channel received by the second tuner is advanced common application platform (ACAP) type.

3. The broadcasting receiver for offering the EPG of the background channel as claimed in claim 1, further comprising:
   a demultiplexer configured to demultiplex and output a broadcasting stream received by the second tuner; and
   a section filter configured to filter DSM-CC section data from the demultiplexed stream.

4. The broadcasting receiver for offering the EPG of the background channel as claimed in claim 3, wherein the demultiplexer decodes a PSI table of transport stream (TS) received by the second tuner and the demultiplexer outputs corresponding TS based on PID defined in PMT table of PSI table.

5. The broadcasting receiver for offering the EPG of the background channel as claimed in claim 3, wherein the section filter filters DSM-CC section data and DSM-CC private section data located in payload of the demultiplexed data stream based on a value of table_id.

6. The broadcasting receiver for offering the EPG of the background channel as claimed in claim 3, wherein the data parser parses a file system structure of an object unit broadcasting program contents from the DSM-CC section data filtered by the section filter based on an object key.

7. The broadcasting receiver for offering the EPG of the background channel as claimed in claim 6, wherein the data parser parses data carousel module, object carousel module, download server initiate (DSI), download info indication (DII) from the DSM-CC section data filtered by the section filter by using ZAVA program.

8. The broadcasting receiver for offering the EPG of the background channel as claimed in claim 7, wherein the data parser forms a file system structure of object unit broadcasting program contents from the DSM-CC private section based on the object key defined in the object carousel.

9. The broadcasting receiver for offering the EPG of the background channel as claimed in claim 1, wherein the storage unit stores the broadcasting program contents collected by the data parser in a file system type having an object unit directory structure.

10. The broadcasting receiver for offering the EPG of the background channel as claimed in claim 1, wherein the EPG application manager comprises:
    an EPG key generator configured to generate an EPG application key of the channel received by the second tuner by operating the object key that is an object identifier from the DSM-CC section data stored in the storage unit;
    an EPG image processor configured to generate video data of the channel received by the second tuner based on the generated EPG application key to capture the generated video data as program image of a corresponding background channel; and
    an EPG data encoder configured to encode the captured video data of the channel received by the second tuner into an image file of the EPG data.

11. The broadcasting receiver for offering the EPG of the background channel as claimed in claim 10, wherein the EPG image processor generates the video data of the background channel by acquiring location information of program contents registered in the file system based on the object key.

12. The broadcasting receiver for offering the EPG of the background channel as claimed in claim 10, wherein the EPG image processor comprises:
   an image capturer configured to capture the video data of the background channel by acquiring the location of background channel program contents based on the object key that is the only identifier capable of identifying objects from the DSM-CC section data;
   an image extractor configured to extract an EPG program image of the background channel based on the scene priority and the storage number of the captured video data, to be inserted on EPG; and
   an image scaler configured to resize the extracted EPG program image of the background channel to suit to an output screen of the EPG data of the background channel.

13. The broadcasting receiver for offering the EPG of the background channel as claimed in claim 1, wherein the image data is inserted in the EPG that is the broadcasting program information of the channel received by the second tuner.

14. The broadcasting receiver for offering the EPG of the background channel as claimed in claim 13, wherein the channel moves to a corresponding channel based on the object key, if the program image on the EPG is operated.

15. The broadcasting receiver for offering the EPG of the background channel as claimed in claim 1, wherein the changed image data is periodically updated and stored.

16. A broadcasting receiver for offering EPG, comprising:
   a tuner configured to tune a channel selected by a user;
   a data parser configured to collect a data broadcasting signal of the selected channel;
   an image processor configured to process and change the collected data broadcasting signal into image data;
   a display unit configured to display broadcasting program information of the selected channel having the changed image data inserted therein; and
   an EPG application manager configured to capture and process video data of a channel received by the tuner by operating an object key from an object unit file system corresponding to the stored image data to be inserted as an EPG program image,
   wherein the EPG program image is displayed along with a broadcasting program image of the selected channel on a screen.

17. The broadcasting receiver for offering the EPG as claimed in claim 16, wherein the changed image data is displayed in specific information of the EPG.

18. The broadcasting receiver for offering the EPG as claimed in claim 17, wherein sub-image search related to the program is offered by using a navigation key in the specific information of the EPG.

19. The broadcasting receiver for offering the EPG as claimed in claim 17, wherein the channel moves to a corresponding channel based on the object key if the program image on the EPG is operated.

20. The broadcasting receiver for offering the EPG as claimed in claim 16, wherein the channel received by the tuner is ACAP type.

21. The broadcasting receiver for offering the EPG as claimed in claim 16, wherein the EPG application manager comprises:
   an EPG key generator configured to generate an EPG application key of the channel received by the tuner by operating the object key that is an object identifier from the DSM-CC section data of the collected data broadcasting signal;
   an EPG image processor configured to generate video data of the channel received by the tuner based on the generated EPG application key to capture the generated video data as a program image of the selected channel; and
   an EPG data encoder configured to encode the captured video data into an image file of the EPG data.

22. The broadcasting receiver for offering the EPG as claimed in claim 21, wherein the EPG image processor generates the video data of the selected channel by acquiring location information of program contents registered in the file system based on the object key.

23. The broadcasting receiver for offering the EPG as claimed in claim 21, wherein the EPG image processor comprises:
   an image capturer configured to capture the video data of the selected channel by acquiring the location of the selected channel program contents based on the object key that is the only identifier capable of identifying objects from the DSM-CC section data;
   an image extractor configured to extract an EPG program image of the selected channel based on the scene priority and the storage number of the captured video data, to be inserted on EPG; and
   an image scaler configured to resize the extracted EPG program image to suit to an output screen of the EPG data of the selected channel.

24. A method of offering EPG of a background channel to a broadcasting receiver, comprising:
   displaying a broadcasting program of a first channel selected by a user by using a first tuner;
   collecting a data broadcasting signal out of the received broadcasting signal by using a second tuner;
   processing the collected data broadcasting signal into image data;
   storing the changed image data; and
   displaying broadcasting program information of a second channel received by the second tuner on a screen of the first channel tuned by the first tuner, with the stored image data inserted in the broadcasting program information,
   wherein the image data is inserted in an EPG that is broadcasting program information of the second channel received by the second tuner,
   wherein an object key is operated from an object unit file system corresponding to the stored image data, and video data of the second channel received by the second tuner is captured and processed to be an EPG program image, and
   wherein the EPG program image is displayed along with the broadcasting program image of the first channel on the screen.

25. The method of offering the EPG of the background channel to the broadcasting receiver as claimed in claim 24, wherein the second tuner receives the other channels except the first channel tuned by the first tuner.

26. The method of offering the EPG of the background channel to the broadcasting receiver as claimed in claim 24, wherein the second channel received by the second tuner is ACAP type.

27. The method of offering the EPG of the background channel to the broadcasting receiver as claimed in claim 24, further comprising steps of:
   demultiplexing and outputting broadcasting stream received by the second tuner; and extracting DSM-CC section data from the demultiplexed stream.

28. The method of offering the EPG of the background channel to the broadcasting receiver as claimed in claim 27, wherein the step of demultiplexing the received broadcasting stream decodes a PSI table of the broadcasting stream and outputs corresponding broadcasting steam based on a PID defined in a PMP table of a PSI table.

29. The method of offering the EPG of the background channel to the broadcasting receiver as claimed in claim 27, wherein the step of extracting the DSM-CC section data filters the DSM-CC section data into DSM-Cc section data located in a payload of the demultiplexed data stream and DSM-CC private section data based on a value of table_id.

30. The method of offering the EPG of the background channel to the broadcasting receiver as claimed in claim 27, wherein a data carousel module, an object carousel module and DSI and DII are parsed from the extracted DSM-CC section data by using ZAVA program.

31. The method of offering the EPG of the background channel to the broadcasting receiver as claimed in claim 30, wherein a file system structure of object unit broadcasting program contents is formed based on an object key defined in the parsed object carousel.

32. The method of offering the EPG of the background channel to the broadcasting receiver as claimed in claim 24, wherein contents of the collected data broadcasting signal are stored in a file system type having an object unit directory structure.

33. The method of offering the EPG of the background channel to the broadcasting receiver as claimed in claim 24, wherein the step of inserting the image data in the EPG comprises steps of:
  operating an object key from the stored object unit file system and generating an EPG application key of the channel received by the second tuner based on the operated object key that is an object identifier;
  generating video data of the channel received by the second tuner and capturing/processing the generated video data as an EPG program image of a corresponding background channel; and
  encoding the captured video data of the background channel into an image file of EPG data.

34. The method of offering the EPG of the background channel to the broadcasting receiver as claimed in claim 33, wherein the step of capturing/processing the EPG program image of the channel received by the second tuner comprises steps of:
  operating an object key that is the only identifier capable of identifying objects from DSM-CC section data and capturing video data of the background channel by acquiring a broadcasting program content location of the channel received by the second tuner;
  extracting an EPG program image of the channel received by the second tuner based on a scene priority and a storage number of the captured video data, to be inserted on the EPG; and
  resizing the extracted EPG program image of the background channel to suit to an output screen of the EPG data of the background channel.

35. The method of offering the EPG of the background channel to the broadcasting receiver as claimed in claim 24, wherein the video data of the background channel is generated by acquiring location information of broadcasting program contents registered in the stored object unit file system based on the object key.

36. The method of offering the EPG of the background channel to the broadcasting receiver as claimed in claim 24, wherein the first channel changes to a corresponding channel based on the object key, if the program image on the EPG is operated.

37. The method of offering the EPG of the background channel to the broadcasting receiver as claimed in claim 24, wherein the changed image data is periodically updated and stored.

38. The method of offering the EPG of the background channel to the broadcasting receiver as claimed in claim 24, wherein program specific information of the second channel received by the second tuner is displayed in a block, if the program image on the EPG having the image data inserted therein is selected.

39. The method of offering the EPG of the background channel to the broadcasting receiver as claimed in claim 38, wherein a functional button for moving to the former or next image of the broadcasting program is provided on the EPG.

40. The method of offering the EPG of the background channel to the broadcasting receiver as claimed in claim 38, wherein functional buttons for location shift, confirmation, former/next step, data search, reservation recording/viewing, cancellation and exit are further provided on the EPG.

41. The method of offering the EPG of the background channel to the broadcasting receiver as claimed in claim 24, wherein the program image of the second channel received by the second tuner is offered based on scene priority of a corresponding program and the number of the stored video data.

42. The method of offering the EPG of the background channel to the broadcasting receiver as claimed in claim 38, wherein the program specific information of the second channel received by the second tuner comprises basic information of broadcasting contents including a title, genre, abstract, keyword and playing role, group information including a cast and producer and critic information of the contents and information on a content list and a preference list viewed by the user.

43. A method of offering EPG of a background channel to a broadcasting receiver, comprising:
  receiving a broadcasting stream by tuning a selected channel;
  collecting a data broadcasting signal from the received broadcasting stream;
  processing and changing the collected data broadcasting signal into image data;
  displaying broadcasting program information with the changed image data inserted in an EPG of the selected channel; and
  displaying program specific information of the selected channel in an image block if a program image on the EPG having the image data inserted therein is selected,
  wherein the image data is inserted in the EPG that is broadcasting program information of the selected channel,
  wherein an object key is operated by an object unit file system corresponding to the image data, and the image data is captured and processed to be an EPG program image, and
  wherein the EPG program image is displayed along with the broadcasting program image of the channel on a screen.

* * * * *